US012634810B2

(12) United States Patent
Lin

(10) Patent No.: US 12,634,810 B2
(45) Date of Patent: May 19, 2026

(54) SIGNAL LEVEL ENHANCED NETWORK SELECTION AT SWITCH-ON OR RECOVERY FROM LACK OF COVERAGE

(71) Applicant: MEDIATEK INC., Hsin-Chu (TW)

(72) Inventor: Yuan-Chieh Lin, Hsin-Chu (TW)

(73) Assignee: MediaTek Inc., Hsinchu City (TW)

( * ) Notice: Subject to any disclaimer, the term of this patent is extended or adjusted under 35 U.S.C. 154(b) by 316 days.

(21) Appl. No.: 18/214,122

(22) Filed: Jun. 26, 2023

(65) Prior Publication Data

US 2024/0031927 A1 Jan. 25, 2024

Related U.S. Application Data

(60) Provisional application No. 63/368,997, filed on Jul. 21, 2022.

(51) Int. Cl.
*H04W 48/18* (2009.01)
*H04B 17/318* (2015.01)
(Continued)

(52) U.S. Cl.
CPC .......... *H04W 48/18* (2013.01); *H04B 17/318* (2015.01); *H04W 84/042* (2013.01)

(58) Field of Classification Search
CPC ... H04W 48/18; H04W 48/20; H04W 84/042; H04B 17/318; H04B 17/327–347
See application file for complete search history.

(56) References Cited

U.S. PATENT DOCUMENTS 9,125,146 B1 * 9/2015 Edara .................... H04W 48/18
10,506,500 B2 * 12/2019 Ji .......................... H04W 48/16
(Continued)

FOREIGN PATENT DOCUMENTS

WO WO2022/014962 A1 7/2020
WO WO2022/115733 A1 8/2021

OTHER PUBLICATIONS

3GPP TSG-CT WG1 Meeting #138-e, E-Meeting, Oct. 10-14, 2022, C1-226124, "LS on SENSE for home PLMN and disaster roaming PLMN" (Year: 2022).*

(Continued)

*Primary Examiner* — Jenee Holland
(74) *Attorney, Agent, or Firm* — Helen Mao; Zheng Jin; Imperium Patent Works

(57) ABSTRACT

Method and apparatus are provided for automatic network selection at switch-on or recovery from loss of coverage. In one novel aspect, during network selection upon UE switch on or recovery from lack of coverage, the UE sets the priority of a Public Land Mobile Network (PLMN) broadcasting disaster related indication to be absolutely lower than other PLMNs no matter the received signal strength or quality of the corresponding PLMN. The UE, supporting Signal level Enhanced Network Selection (SENSE) for network selection, performs an automatic network selection procedure using an obtained SENSE threshold. The UE detects a first PLMN (not offering disaster services) with a first signal level below the SENSE threshold, and a second PLMN offering disaster services with a second signal level above the SENSE threshold. The UE prioritizes the first PLMN over the second PLMN when the UE receives a disaster indication from the second PLMN.

12 Claims, 4 Drawing Sheets

(51) Int. Cl.
　　*H04W 4/90*　　　　(2018.01)
　　*H04W 12/40*　　　(2021.01)
　　*H04W 84/04*　　　(2009.01)

(56)　　　　　　References Cited

U.S. PATENT DOCUMENTS

| | | | | |
|---|---|---|---|---|
| 2003/0040311 | A1* | 2/2003 | Choi | H04W 48/20 |
| | | | | 455/434 |
| 2006/0084441 | A1* | 4/2006 | Dowling | H04W 24/04 |
| | | | | 455/445 |
| 2008/0146280 | A1* | 6/2008 | Sasse | H04W 8/183 |
| | | | | 455/558 |
| 2011/0207453 | A1* | 8/2011 | Hsu | H04W 88/06 |
| | | | | 455/424 |
| 2013/0084855 | A1* | 4/2013 | Ekici | H04W 52/0245 |
| | | | | 455/435.2 |
| 2013/0337850 | A1* | 12/2013 | Ljung | H04W 68/12 |
| | | | | 455/574 |
| 2015/0215832 | A1* | 7/2015 | Fitzpatrick | H04W 48/14 |
| | | | | 455/426.1 |
| 2015/0296364 | A1* | 10/2015 | Peruru | H04W 88/06 |
| | | | | 455/434 |
| 2016/0095144 | A1* | 3/2016 | Lindoff | H04W 76/14 |
| | | | | 370/329 |
| 2020/0305118 | A1* | 9/2020 | Ryu | H04W 76/10 |
| 2022/0167185 | A1* | 5/2022 | Kim | H04W 76/19 |
| 2022/0182854 | A1* | 6/2022 | Kim | H04W 48/18 |
| 2022/0217553 | A1 | 7/2022 | Kim | H04W 24/04 |
| 2022/0217805 | A1* | 7/2022 | Niemi | H04W 60/06 |
| 2022/0225214 | A1* | 7/2022 | Vamanan | H04W 4/90 |
| 2022/0232363 | A1* | 7/2022 | Watfa | H04W 4/90 |
| 2022/0256445 | A1* | 8/2022 | Sedin | H04B 7/18539 |
| 2022/0264275 | A1* | 8/2022 | Vamanan | H04W 8/12 |
| 2022/0286953 | A1* | 9/2022 | Long | H04W 12/06 |
| 2023/0362804 | A1* | 11/2023 | Yang | H04W 72/542 |
| 2024/0073808 | A1* | 2/2024 | Yi | H04W 48/20 |
| 2024/0147355 | A1* | 5/2024 | Gupta | H04W 48/18 |
| 2024/0155476 | A1* | 5/2024 | Lin | H04W 48/18 |
| 2024/0314595 | A1* | 9/2024 | Starsinic | H04W 24/04 |
| 2025/0203423 | A1* | 6/2025 | Kim | H04W 24/10 |

OTHER PUBLICATIONS

European Intellectual Property Office Action 23185297.1-1216., dated Dec. 19, 2023 (11 pages).
3rd Generation Partnership Project; Technical Specification Group Services and System Aspects; Service accessibility (Release 18), 3GPP TS 22.011 V18.3.0 (Jun. 2022), p. 1-34, 3GPP, Valbonne, France, XP052182907.

\* cited by examiner

PRIORITY OF

| R or (E)HPLMN - 117dBm |
| --- |
| U- PLMN - 117dBm |
| O- PLMN - 117dBm |
| LQ- PLMN - 117dBm |

IS HIGHER THAN

| Preferred Disaster PLMN - 113dBm |
| --- |
| Other Disaster PLMN - 113dBm |

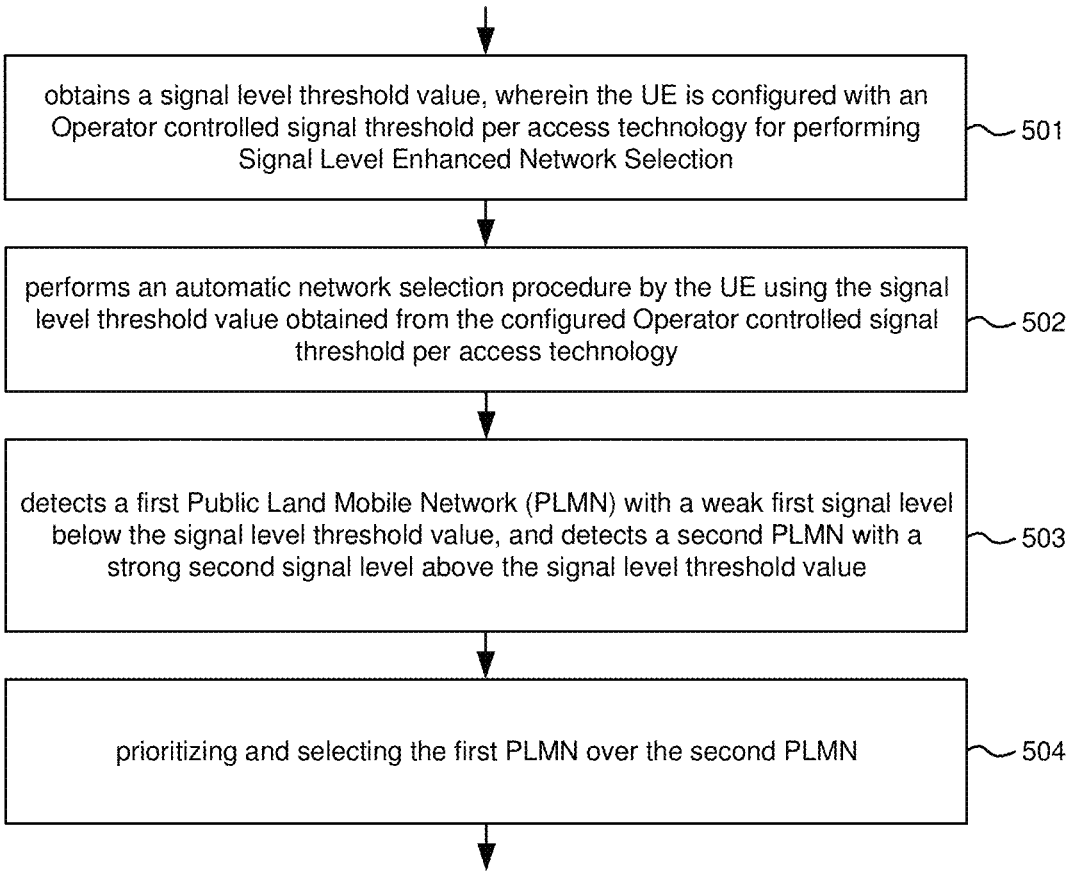

obtains a signal level threshold value, wherein the UE is configured with an Operator controlled signal threshold per access technology for performing Signal Level Enhanced Network Selection ~ 501 performs an automatic network selection procedure by the UE using the signal level threshold value obtained from the configured Operator controlled signal threshold per access technology ~ 502 detects a first Public Land Mobile Network (PLMN) with a weak first signal level below the signal level threshold value, and detects a second PLMN with a strong second signal level above the signal level threshold value ~ 503 prioritizing and selecting the first PLMN over the second PLMN ~ 504

FIG. 5

SIGNAL LEVEL ENHANCED NETWORK SELECTION AT SWITCH-ON OR RECOVERY FROM LACK OF COVERAGE

CROSS REFERENCE TO RELATED APPLICATIONS

This application claims priority under 35 U.S.C. § 119 from U.S. Provisional Application No. 63/368,997, entitled "Signal Level Enhanced Network Selection at Switch-On or Recovery from Lack of Coverage", filed on Jul. 21, 2022, the subject matter of which is incorporated herein by reference.

TECHNICAL FIELD

The disclosed embodiments relate generally to wireless mobile communication networks, and, more particularly, to methods for UE performing Signal level Enhanced Network SElection (SENSE) at switch-on or recovery from lack of coverage.

BACKGROUND

A Public Land Mobile Network (PLMN) is a network established and operated by an administration or recognized operating agency (ROA) for the specific purpose of providing land mobile communication services to the public. PLMN provides communication possibilities for mobile users. A PLMN may provide service in one or a combination of frequency bands. Access to PLMN services is achieved by means of an air interface involving radio communications between mobile phones and base stations with integrated IP network services. One PLMN may include multiple radio access networks (RAN) utilizing different radio access technologies (RAT) for accessing mobile services. A radio access network is part of a mobile communication system, which implements a radio access technology. Conceptually, RAN resides between a mobile device and provides connection with its core network (CN). Depending on the standard, mobile phones and other wireless connected devices are varyingly known as user equipment (UE, i.e., MS), terminal equipment (TE), mobile stations (MS, i.e., UE), mobile termination (MT), etc. Examples of different RATs include 2G GERAN (GSM) radio access network, 3G UTRAN (UMTS) radio access network, 4G E-UTRAN (LTE), 5G new radio (NR) radio access network, NG-RAN (Next-Generation RAN), and other non-3GPP access RAT including WiFi.

At switch on or following recovery from lack of coverage, a UE is responsible for selecting a PLMN. The UE NAS layer requests the UE AS layer to report available PLMN, and the NAS layer is responsible for selecting a PLMN from the list of reported PLMN. PLMN can be selected manually or automatically. In the case of automatic selection, the UE selects the PLMN and radio access technology (RAT) using the following order of priority: 1) registered PLMN or equivalent PLMN, 2) HPLMN or the highest priority EHPLMN, 3) PLMN and RAT combinations defined within User-controlled PLMN selector, 4) PLMN and RAT combinations defined within Operator-controlled PLMN selector, 5) Other PLMN reported as high quality PLMN, selected in random order, 6) Other PLMN selected in order of decreasing signal quality, and 7) PLMN broadcasting the disaster related indication.

During the initial steps of selecting a network after switch-on or recovery from the loss of coverage, and during all steps of periodic re-selection, the signal level of available cells is not considered, solely the cell selection criteria as broadcast by the PLMN and the priority of networks are considered. This behavior results in UEs selecting or staying on a network of which the coverage on that particular place is poor, because the PLMN has higher priority, while other PLMNs of lower priority would be available with much better local coverage. For typical consumer UEs, this is not a problem. Due to mobility, the conditions change quickly and there is a user who recognizes the problems and can react, e.g. by changing the UE location. In fact, it is the desired behavior as part of steering of roaming and avoids frequent change of networks. However, it can be a problem for stationary devices without supervision by a user.

Therefore, an improvement is needed that allows UEs to take the signal level into account during the initial steps of network selection after switch-on or recovery from loss of coverage and during all steps of the periodic re-selection.

SUMMARY

In accordance with one novel aspect, a method of automatic network selection at switch-on or recovery from loss of coverage is proposed. Under the existing Signal level Enhanced Network SElection (SENSE) solution, a PLMN with received signal quality>=the "Operator controlled signal threshold per access technology" has higher priority than a PLMN with received signal quality<the "Operator controlled signal threshold per access technology". In one novel aspect, during network selection upon UE switch on or recovery from lack of coverage, the UE sets the priority of a PLMN broadcasting disaster related indication to be absolutely lower than other PLMNs (e.g., registered PLMN, HPLMN/EHPLMN, U-PLMN, O-PLMN, and LQ-PLMN), no matter the received signal strength or quality of the corresponding PLMN.

In one embodiment, a UE obtains a Signal level Enhanced Network SElection (SENSE) threshold, wherein the UE supports SENSE for network selection. The UE performs an automatic network selection procedure using the SENSE threshold. The UE detects a first PLMN (not offering disaster services) with a first signal level below the SENSE threshold, and detects a second PLMN offering disaster services with a second signal level above the SNESE threshold. The UE prioritizes and selects the first PLMN over the second PLMN when the UE receives a disaster indication from the second PLMN.

Other embodiments and advantages are described in the detailed description below. This summary does not purport to define the invention. The invention is defined by the claims.

BRIEF DESCRIPTION OF THE DRAWINGS

FIG. 5 is a flow chart of a method performing Signal level Enhanced Network SElection (SENSE) at switch-on or recovery from lack of coverage in accordance with one novel aspect.

DETAILED DESCRIPTION

Reference will now be made in detail to some embodiments of the invention, examples of which are illustrated in the accompanying drawings.

Figure 1:
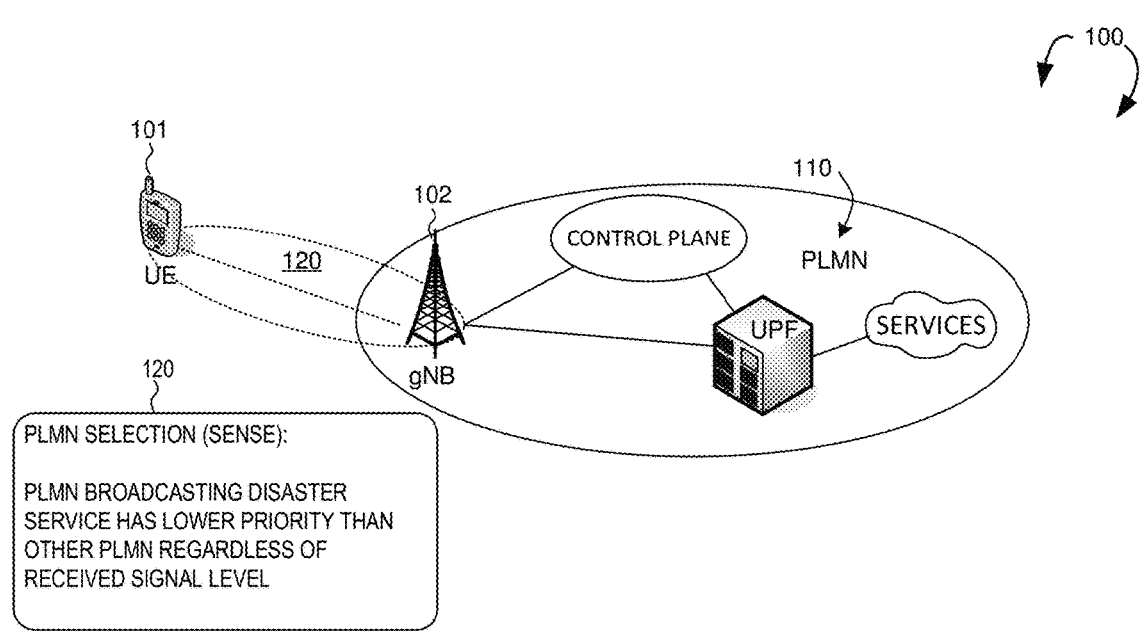
FIG. 1 schematically shows a communication system having a Public Land Mobile Network (PLMN) and a User Equipment (UE) performing Signal level Enhanced Network SElection (SENSE) at switch-on or recovery from lack of coverage in accordance with one novel aspect.

FIG. 1 schematically shows a communication system 100 having a Public Land Mobile Network (PLMN) 110 and a User Equipment (UE) 101 performing Signal level Enhanced Network SElection (SENSE) at switch-on or recovery from lack of coverage in accordance with one novel aspect. PLMN network 110 comprises control plane functionalities, user plane functionality (e.g., UPF), and applications that provides various services by communicating with a plurality of user equipments (UEs) including UE 101. Serving base station gNB 102 belong to part of radio access network RAN 120. RAN 120 provides radio access for UE 101 via a Radio Access Technology (RAT). An access and mobility management function (AMF) in PLMN 110 communicates with gNB 102. UE 101 may be equipped with a radio frequency (RF) transceiver or multiple RF transceivers.

The number of IoT devices is growing exponentially and with that also the number of stationary UEs. Such UEs provide connectivity for all kinds of sensors in monitoring and warning networks, e.g. water level measurements in high-water warning networks, temperature measurement of high voltage lines or metering devices for power or water. The IoT modules could be located outdoors in very remote locations, in places that cannot be reached easily after the deployment or deep indoors. In addition, those UEs do not move, and they are often in a permanent roaming situation, either because the modules were deployed in other countries than that of the provided USIMs or because of the use of Global USIMs for IoT use cases. While most of the UEs work fine, a small percentage of UEs experience unstable conditions. This means, sometimes they select a VPLMN and stay on that VPLMN, where they can barely attach, and due to changing radio conditions (e.g. fading, absorption etc.) setting up a data bearer occasionally or nearly always fails. It is not possible for the operators of the PLMNs to detect such problems and once such cases occur, manual intervention on site is needed to identify and fix the problem, i.e. some field engineer of the device manufacturer or the operator of the IoT service needs to intervene on site.

PLMN can be selected manually or automatically. In the case of automatic selection, the UE selects the PLMN and radio access technology (RAT) using predefined order of priority. During the initial steps of selecting a network after switch-on or recovery from the loss of coverage, and during all steps of periodic re-selection, traditionally the signal level of available cells was not considered, solely the cell selection criteria as broadcast by the PLMN and the priority of networks were considered. This behavior results in UEs selecting or staying on a network of which the coverage on that particular place is poor (satisfying cell selection criteria is in most case very easy, a very weak signal can satisfy the criteria), because the PLMN has higher priority, while other PLMNs of lower priority would be available with much better local coverage. For typical consumer UEs this is not a problem. Due to (user/human) mobility, the conditions change quickly and there is a user who recognizes the problems and can react, e.g. by changing the location or by using manual network selection. In fact, it is the desired behavior as part of steering of roaming and avoids frequent changes of networks. However, it can be a problem for stationary devices without supervision by a user.

A method of Signal level Enhanced Network SElection (SENSE) at switch-on or recovery from lack of coverage is thus proposed to take the signal level into account, by introducing an Operator controlled signal threshold per access technology on the USIM that can be updated using the Steering Of Roaming (SOR) mechanism. This method can enhance the automatic network selection procedures when the Operator controlled signal threshold per access technology is set. In a first iteration, the UE additionally applies the Operator controlled signal threshold as an additional criterion in each step of the selection process. If registration cannot be achieved during the first iteration, a second iteration of the process is then performed without applying the Operator controlled signal threshold. If the Operator controlled signal threshold is not set, then the network selection procedure is not changed. Under the existing SENSE method, however, a PLMN candidate for disaster roaming may have higher priority than other PLMN candidates for normal services.

Accordingly, UE 101 applies signal level enhanced network selection if the following conditions are fulfilled: 1) the UE is in automatic PLMN selection mode; 2) the UE supports "Operator controlled signal threshold per access technology"; 3) the UE is configured (by MO (Management Object)) for using signal level enhanced network selection; 4) the UE is configured by USIM for using signal level enhanced network selection; and 5) the "Operator controlled signal threshold per access technology" is configured in the USIM. The UE can be configured with an "Operator controlled signal threshold per access technology" stored in the USIM consisting of one or more entries, each entry containing: a) a home operator controlled signal threshold; and b) an access technology. The "Operator controlled signal threshold per access technology" is specific for a certain access technology and when applicable, applies to all PLMNs with the corresponding access technology combination. The allowed range of the Operator controlled signal threshold per access technology is between the cell selection criterion and the high quality signal.

Under the existing SENSE, a PLMN with received signal quality>=the "Operator controlled signal threshold per access technology" has higher priority than a PLMN with received signal quality<the "Operator controlled signal threshold per access technology". In one novel aspect (as depicted in 120), during network selection upon UE switch on or recovery from lack of coverage, UE 101 sets the priority of a PLMN broadcasting disaster related indication to be absolutely lower than other PLMNs (e.g., registered PLMN, HPLMN/EHPLMN, U-PLMN, O-PLMN, and LQ-PLMN), no matter the received signal strength or quality of the corresponding PLMN.

Figure 2:
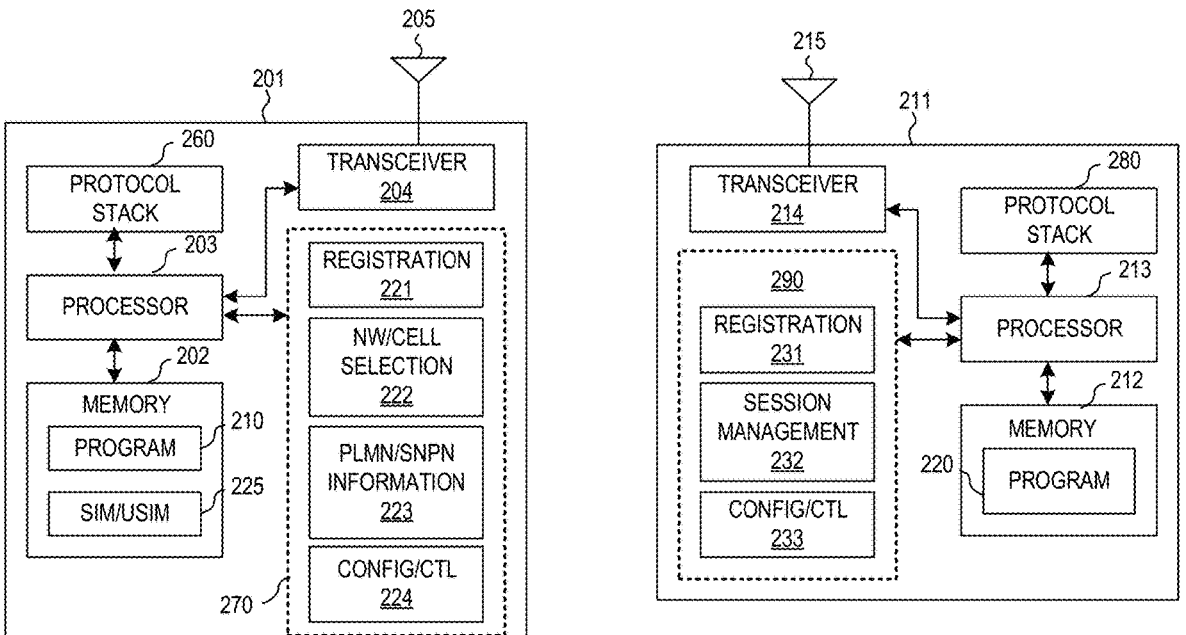
FIG. 2 illustrates simplified block diagrams of a user equipment and a network entity in accordance with embodiments of the current invention.

FIG. 2 illustrates simplified block diagrams of wireless devices, e.g., a UE 201 and network entity 211 in accordance with embodiments of the current invention. Network entity 211 may be a base station combined with an AMF. Network entity 211 has an antenna 215, which transmits and receives radio signals. A radio frequency RF transceiver module 214, coupled with the antenna, receives RF signals from antenna 215, converts them to baseband signals and sends them to processor 213. RF transceiver 214 also converts received baseband signals from processor 213, converts them to RF signals, and sends out to antenna 215. Processor 213 processes the received baseband signals and invokes different functional modules to perform features in base station 211. Memory 212 stores program instructions and data 220 to control the operations of base station 211. In the example of FIG. 2, network entity 211 also includes a set of control functional modules and circuit 290. Registration circuit 231 handles registration and mobility procedure. Session management circuit 232 handles session management functionalities. Configuration and control circuit 233 provides different parameters to configure and control UE.

Similarly, UE 201 has memory 202, a processor 203, and radio frequency (RF) transceiver module 204. RF transceiver 204 is coupled with antenna 205, receives RF signals from antenna 205, converts them to baseband signals, and sends them to processor 203. RF transceiver 204 also converts received baseband signals from processor 203, converts them to RF signals, and sends out to antenna 205. Processor 203 processes the received baseband signals and invokes different functional modules and circuits to perform features in UE 201. Memory 202 stores data and program instructions 210 to be executed by the processor to control the operations of UE 201. Suitable processors include, by way of example, a special purpose processor, a digital signal processor (DSP), a plurality of micro-processors, one or more micro-processor associated with a DSP core, a controller, a microcontroller, application specific integrated circuits (ASICs), file programmable gate array (FPGA) circuits, and other type of integrated circuits (ICs), and/or state machines. A processor associated with software may be used to implement and configure features of UE 201.

UE 201 also comprises a set of functional modules and control circuits to carry out functional tasks of UE 201. Protocol stacks 260 comprise Non-Access-Stratum (NAS) layer to communicate with an AMF entity connecting to the core network, Radio Resource Control (RRC) layer for high layer configuration and control, Packet Data Convergence Protocol/Radio Link Control (PDCP/RLC) layer, Media Access Control (MAC) layer, and Physical (PHY) layer. System modules and circuits 270 may be implemented and configured by software, firmware, hardware, and/or combination thereof. The function modules and circuits, when executed by the processors via program instructions contained in the memory, interwork with each other to allow UE 201 to perform embodiments and functional tasks and features in the network. In one example, system modules and circuits 270 comprise registration circuit 221 that performs registration and mobility procedure with the network, a network and cell selection circuit 222 for performing network and cell selection, a PLMN information maintenance circuit 223 that handles the adding, removing, and resetting of one or more PLMN information in SIM/USIM and/or in UE (non-volatile) memory (source of the information may come from signaling as well), a config and control circuit 224 that handles configuration and control parameters. Note that the network selection and registration related information, such as HPLMN, Operator Controlled PLMN Selector list, User Controlled PLMN Selector list, and the SENSE signal level threshold for PLMN selection, may be stored in SIM/USIM 225 and/or in UE (non-volatile) memory.

Figure 3:
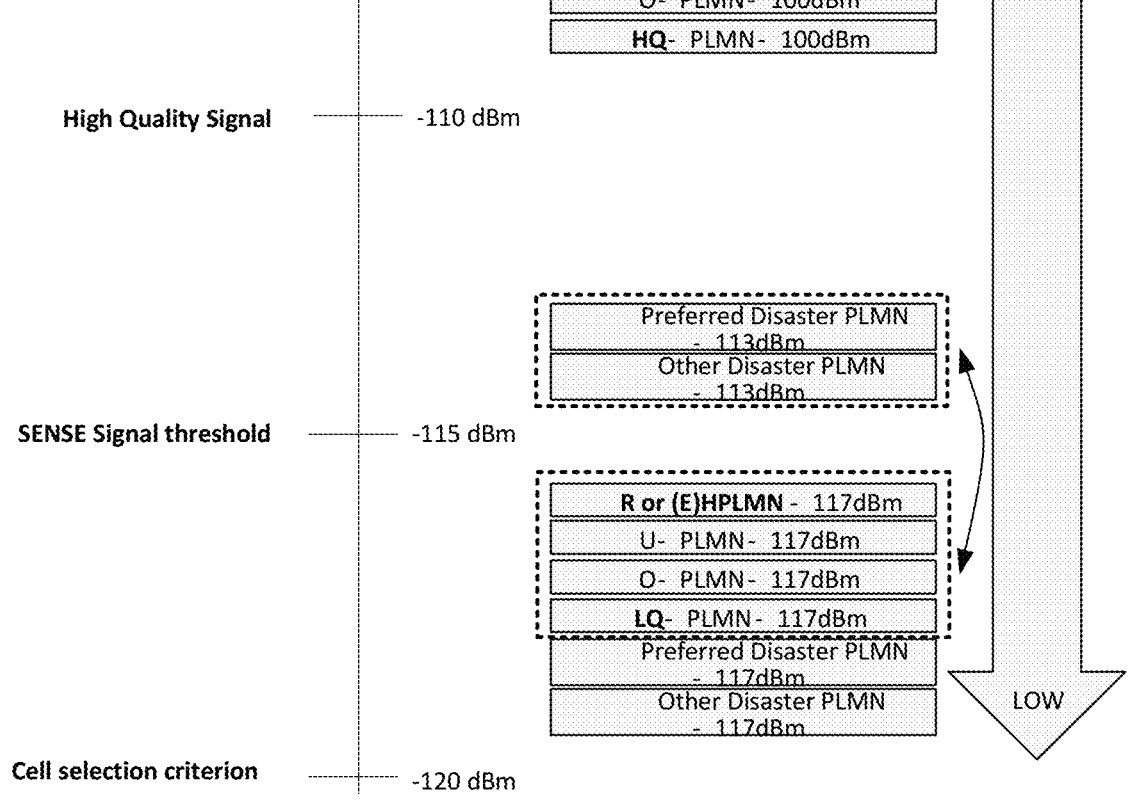
FIG. 3 illustrates different signal level thresholds when UE performing Network selection with Signal level Enhanced Network SElection (SENSE) at switch-on or recovery from lack of coverage.

FIG. 3 illustrates different signal level thresholds when UE performing Network selection with Signal level Enhanced Network SElection (SENSE) at switch-on or recovery from lack of coverage. Under SENSE, the NW supports a mechanism to have an Operator controlled signal threshold (e.g., the SENSE threshold) per access technology on the USIM to be used for network selection. The SENSE threshold is specific for a certain Radio Access Technology (RAT) and shall be applied to all PLMNs with the corresponding RAT combinations. The allowed range of the Operator controlled signal threshold per RAT is between the cell selection criterion and the high quality signal. At switch-on or recovery from lack of coverage, if the Operator controlled signal threshold per RAT is set on the USIM, it shall be used for the selection of the last registered PLMN (and/or EHPLMN/HPLMN) and for the automatic mode network selection.

If the Operator controlled signal threshold per RAT is set on the USIM, then the UE shall only select a network if the network selection conditions as described below are met and the received signal quality of the candidate PLMN/RAT combination is equal to or higher than the SENSE threshold per RAT. In addition, if no candidate PLMN/RAT combination fulfils the Operator controlled signal threshold criteria, the UE shall repeat the network selection procedure without applying the SENSE threshold per RAT.

Specifically, under SENSE, the UE selects the PLMN and RAT using the following order of priority: 1a) RPLMN—registered PLMN or equivalent PLMN (if it is available) using all RATs, if received signal quality>=the "Operator controlled signal threshold per access technology", 2a) (E)HPLMN—either the HPLMN (if the EHPLMN list is not present or is empty) or the highest priority EHPLMN that is available, if received signal quality>=the "Operator controlled signal threshold per access technology", 3a) U-PLMN—each PLMN/RAT combination in the "User controlled PLMN selector with access technology" data file in the SIM (in priority order), if received signal quality>=the "Operator controlled signal threshold per access technology", 4a) O-PLMN—each PLMN/RAT combination in the "Operator controlled PLMN selector with access technology" data file in the SIM (in priority order), if received signal quality>=the "Operator controlled signal threshold per access technology", 5a) HQ-PLMN—Other PLMN/RAT combination with received high quality in random order, 6a) Other PLMN/RAT combination in order of decreasing signal quality, if received signal quality>=the "Operator controlled signal threshold per access technology", and 7a) PLMN broadcasting the disaster related indication, if received signal quality>=the "Operator controlled signal threshold per access technology".

The first tier of priority order listed above is followed by the second tier of priority order as follows: 1b) RPLMN—registered PLMN or equivalent PLMN (if it is available) using all RATs, if received signal quality<the "Operator controlled signal threshold per access technology", 2b) (E)HPLMN—either the HPLMN (if the EHPLMN list is not present or is empty) or the highest priority EHPLMN that is available, if received signal quality<the "Operator controlled signal threshold per access technology", 3b) U-PLMN—each PLMN/RAT combination in the "User controlled PLMN selector with access technology" data file in the SIM (in priority order), if received signal quality<the "Operator controlled signal threshold per access technology", 4b) O-PLMN—each PLMN/RAT combination in the "Operator controlled PLMN selector with access technology" data file in the SIM (in priority order), if received signal quality<the "Operator controlled signal threshold per access technology", 6b) LQ-PLMN—Other PLMN/RAT combination in order of decreasing signal quality, if received signal quality<the "Operator controlled signal threshold per access technology", and 7b) PLMN broadcasting the disaster related indication, if received signal quality<the "Operator controlled signal threshold per access technology".

Under the above design, a UE would prefer all PLMN candidates in the first tier including 7a) over all other PLMN candidates in the second tier including 1b), 2b), 3b), 4b) and 6b). However, the candidate of 7a) is for disaster roaming only, and it should have lower priority than other PLMN candidates for normal services, regardless of the received signal quality. In the example of FIG. 3, UE 301 performs network selection (SENSE). Assume the high quality signal threshold=–110 dBm, the SENSE signal threshold=–115 dBm, and the cell selection criterion=–120 dBm. Under the existing SENSE method, the priority for preferred disaster PLMN(–113 dBm) or other disaster PLMN(–113 dBm) becomes higher than the priority of R or EHPLMN(–117 dBm), U-PLMN(–117 dBm), O-PLMN(–117 dBm), or LQ-PLMN(–117 dBm). Such network selection behavior is thus undesirable, because under any circumstances, the PLMN candidates that are only for disaster services should not have higher priority than PLMN candidates that are for normal services.

Accordingly, the solution is to set the priority for disaster PLMN to be absolutely lower as compared to other PLMNs, no matter the strength or quality of the received signal of the corresponding PLMNs. In another words, the PLMN broadcasting disaster services in 7a) should always have lower priority over all other PLMN candidates in the second tier including 1b), 2b), 3b), 4b) and 6b), e.g., 7a) should be removed from the first tier of priority order. As depicted in FIG. 3, the priority for the preferred disaster PLMN(–113 dBm) or other disaster PLMN(–113 dBm) is always lower than the priority of all other PLMNs having signal levels satisfying the cell selection criterion (e.g., >–120 dBm), including R or (E)HPLMN(–117 dBm), U-PLMN(–117 dBm), O-PLMN(–117 dBm), or LQ-PLMN(–117 dBm).

Figure 4:
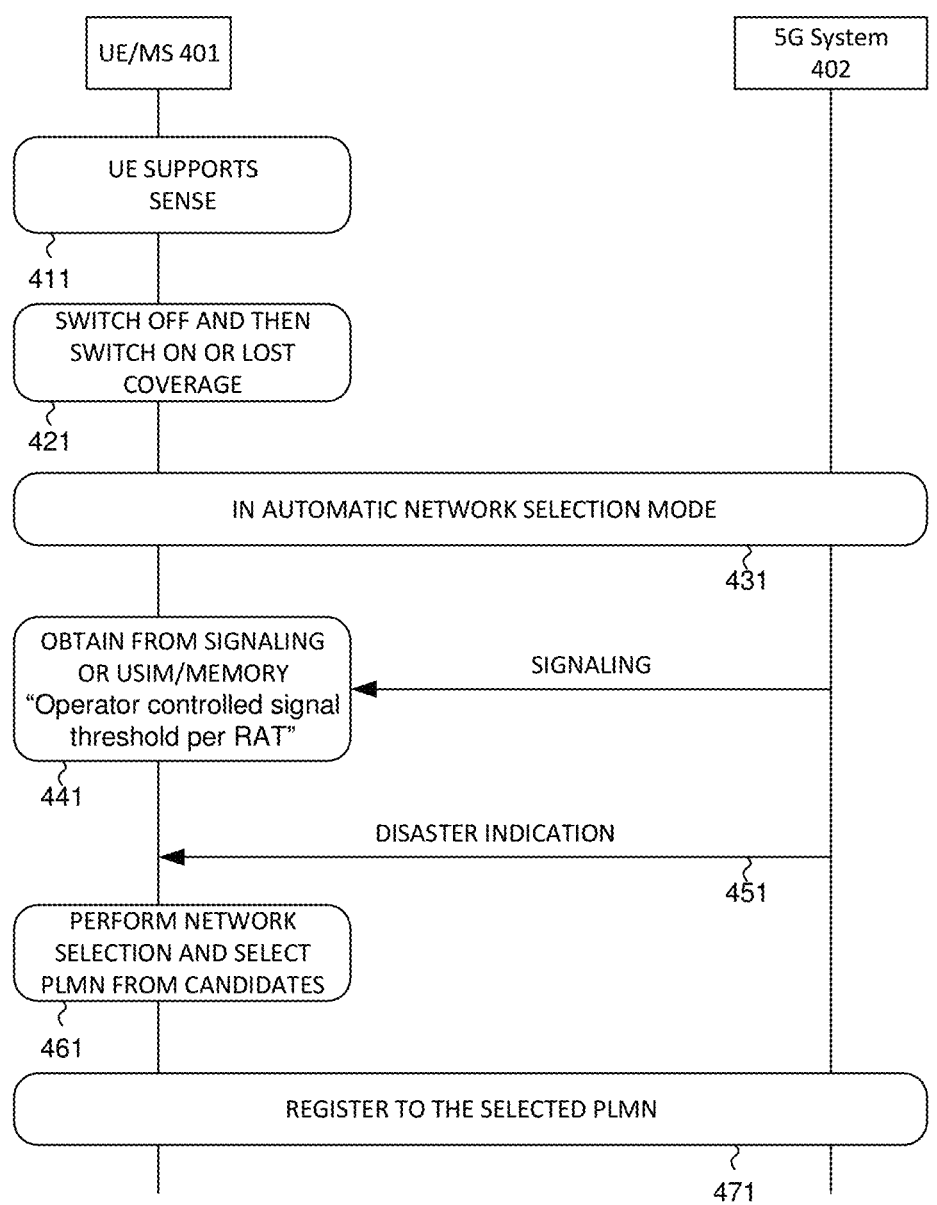
FIG. 4 illustrates a sequence flow between a UE and a network entity for performing SENSE at switch-on or recovery from lack of coverage.

FIG. 4 illustrates a sequence flow between a UE and a network entity for performing SENSE at switch-on or recovery from lack of coverage. In step 411, UE/MS 401 supports and is configured with SENSE for network selection in a 5G system 402. In step 421, UE 401 switches off and then switches back on, or UE 401 has lost radio signal and wants to recover from the lack of radio signal coverage. In step 431, UE 401 determines to perform an automatic network selection procedure in 5GS 402. In step 441, UE 401 obtains an "Operation controlled signal threshold per access technology", e.g., a SENSE threshold per RAT for the network selection procedure. The SENSE threshold can be obtained from UE USIM, UE memory, or signaled from a network entity in 5GS. In step 451, UE 401 receives a disaster related indication that is broadcasted from a disaster PLMN, e.g., a PLMN that provides disaster roaming services. In step 461, UE 401 performs PLMN selection using the obtained SENSE threshold. Under the existing SENSE mechanism, PLMN candidates with radio signal level higher than the SENSE threshold has higher priority than PLMN candidates with radio signal level lower than the SENSE threshold. In one novel aspect, even if the disaster PLMN has radio signal level higher than the SENSE threshold, and another PLMN has radio signal level lower than the SENSE threshold, UE 401 still prefers the PLMN and selects the PLMN for registration (step 471).

FIG. 5 is a flow chart of a method performing Signal level Enhanced Network SElection (SENSE) at switch-on or recovery from lack of coverage in accordance with one novel aspect. In step 501, a UE obtains a signal level threshold value, wherein the UE is configured with an Operator controlled signal threshold per access technology for performing Signal Level Enhanced Network Selection. In step 502, the UE performs an automatic network selection procedure by the UE using the signal level threshold value obtained from the configured Operator controlled signal threshold per access technology. In step 503, the UE detects a first Public Land Mobile Network (PLMN) with a weak first signal level below the signal level threshold value, and detects a second PLMN with a strong second signal level above the signal level threshold value. In step 504, the UE prioritizes and selects the first PLMN over the second PLMN.

Note that the same logic applies to R-PLMN can be applied to R SNPN (Registered SNPN); the same logic applies to (E)H-PLMN can be applied to the SNPN identified by an SNPN identity of the subscribed SNPN in the selected entry of the "list of subscriber data" in the ME, if any; the same logic applies to U-PLMN can be applied to SNPN which broadcasts the indication that access using credentials from a credentials holder is supported and which is identified by an SNPN identity contained in the user controlled prioritized list of preferred SNPNs (in priority order); the same logic applies to O-PLMN can be applied to SNPN which broadcasts the indication that access using credentials from a credentials holder is supported and which is identified by an SNPN identity contained in the credentials holder controlled prioritized list of preferred SNPNs (in priority order), SNPN which broadcasts the indication that access using credentials from a credentials holder is supported and which broadcast a GIN contained in the credentials holder controlled prioritized list of GINs (in priority order), SNPN identified by an SNPN identity which is included neither in the SNPN selection parameters of the entries of the "list of subscriber data" nor in the SNPN selection parameters associated with the PLMN subscription, which does not broadcast a GIN which is included in the credentials holder controlled prioritized list of GINs, and which broadcasts an indication that the SNPN allows registration attempts from MSs that are not explicitly configured to select the SNPN.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:
1. A method, comprising:
   obtaining a signal level threshold value by a User Equipment (UE), wherein the UE is configured with an Operator controlled signal threshold per access technology for performing Signal Level Enhanced Network Selection;
   performing an automatic network selection procedure by the UE using the signal level threshold value obtained from the configured Operator controlled signal threshold per access technology;
   detecting a first Public Land Mobile Network (PLMN) with a weak first signal level below the signal level threshold value, and detecting a second PLMN with a strong second signal level above the signal level threshold value; and
   prioritizing and selecting the first PLMN over the second PLMN.
2. The method of claim 1, wherein the UE receives a disaster indication from the second PLMN.

3. The method of claim 1, wherein the UE performs the automatic network selection procedure at the UE switch-on or upon the UE recovery from lack of coverage.

4. The method of claim 1, wherein the Operator controlled signal threshold per access technology is stored in a universal subscriber identity module (USIM) consisting of one or more entries.

5. The method of claim 1, wherein the UE is configured with a cell selection criterion and a high quality signal level for network selection.

6. The method of claim 5, wherein the signal level threshold value is between the cell selection criterion and the high quality signal level.

7. A User Equipment (UE), comprising:

a transceiver that transmits and receives radio frequency (RF) signal in a wireless network;

a memory, and a processor coupled to the memory, the processor configured to obtain a signal level threshold value, wherein the UE is configured with an Operator controlled signal threshold per access technology for performing Signal Level Enhanced Network Selection;

perform an automatic network selection procedure by the UE using the signal level threshold value obtained from the configured Operator controlled signal threshold per access technology;

detect a first weak radio signal from a first PLMN with a first signal level below the signal level threshold value, and receives a second strong radio signal from a second PLMN with a second signal level above the signal level threshold value; and prioritize and select the first PLMN over the second PLMN.

8. The UE of claim 7, wherein the UE receives a disaster indication from the second PLMN.

9. The UE of claim 7, wherein the UE performs the automatic network selection procedure at the UE switch-on or upon the UE recovery from lack of coverage.

10. The UE of claim 7, wherein the Operator controlled signal threshold per access technology is stored in a universal subscriber identity module (USIM) consisting of one or more entries.

11. The UE of claim 7, wherein the UE is configured with a cell selection criterion and a high quality signal level for network selection.

12. The UE of claim 11, wherein the signal level threshold value is between the cell selection criterion and the high quality signal level.

\* \* \* \* \*